United States Patent [19]

Hashimoto et al.

[11] 4,328,579
[45] May 4, 1982

[54] VOICE BAND MULTIPLEX TRANSMISSION SYSTEM

[75] Inventors: Shinichiro Hashimoto, Koganei; Hiromi Nagabushi, Hino, both of Japan

[73] Assignee: Nippon Telegraph & Telephone Public Corporation, Tokyo, Japan

[21] Appl. No.: 152,916

[22] Filed: May 23, 1980

[30] Foreign Application Priority Data

Jun. 8, 1979 [JP] Japan .................................. 54-71930

[51] Int. Cl.³ ............................................. H04J 1/08
[52] U.S. Cl. ...................................... 370/111; 370/11
[58] Field of Search ........................... 370/11, 110–112, 370/19, 118; 455/20, 118, 112, 313, 314

[56] References Cited

U.S. PATENT DOCUMENTS 3,969,585  7/1976  Boulanger ............................. 370/11
4,151,373  4/1979  Widmer ................................ 370/11
4,238,849  12/1980 Gassmann ............................ 370/11

Primary Examiner—Benedict V. Safourek
Assistant Examiner—Stephen Chin
Attorney, Agent, or Firm—Pollock, Vande Sande and Priddy

[57] ABSTRACT

A system for simultaneously transmitting over the same voice circuit a voice signal and input information other than the voice. First and second sine-wave signals which do not bear any harmonic relation to each other in the band of the voice circuit are simultaneously frequency modulated by the input information, and the modulated outputs are superimposed on the voice signal and transmitted. On the receiving side, the pitch frequency of the voice signal is extracted from the received signal, and the pitch frequency and its integral multiples are removed from the received signal to remove a voice component. At this time, at least one of the first and second sine-wave signals is detected. One of these detected outputs is made to have the same frequency as the other frequency. The converted frequency and the detected frequency are demodulated to obtain the original input information.

23 Claims, 14 Drawing Figures

FIG. 2
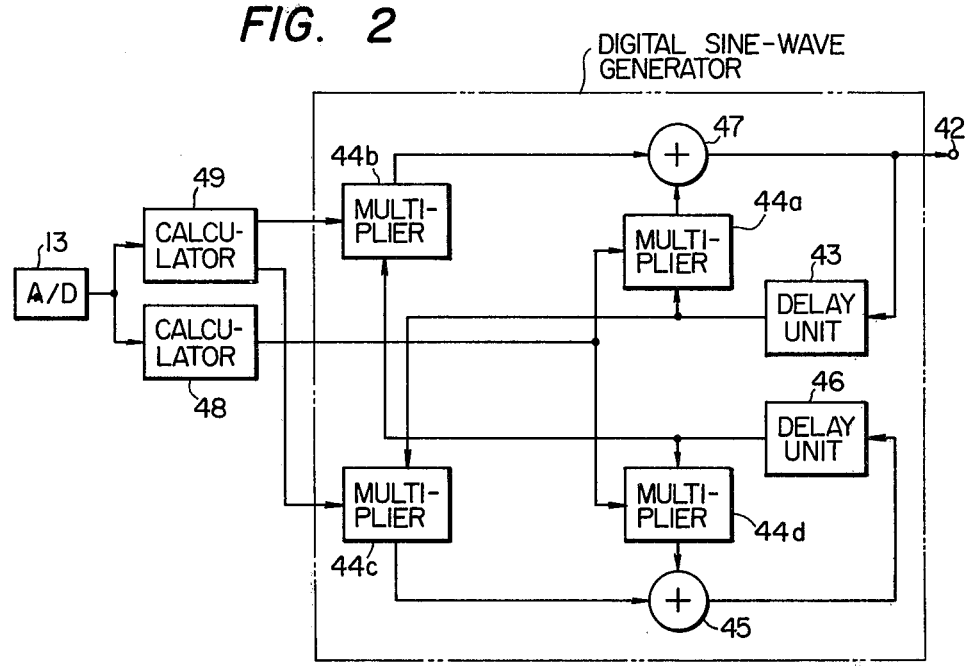
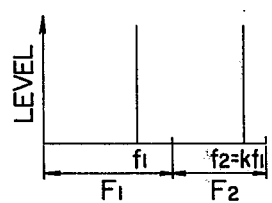
FIG. 3A
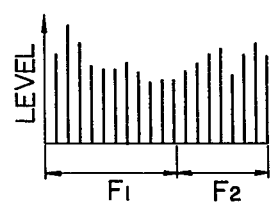
FIG. 3B
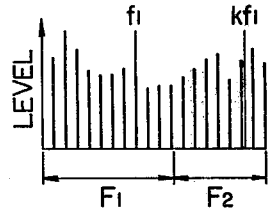
FIG. 3C
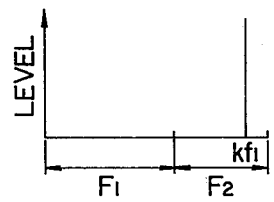
FIG. 3D
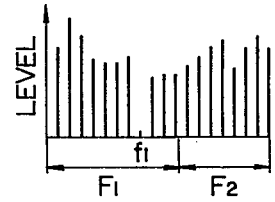
FIG. 3E

VOICE BAND MULTIPLEX TRANSMISSION SYSTEM

BACKGROUND OF THE INVENTION

This invention relates to a voice band multiplex transmission system which permits talking on the telephone simultaneously with the transmission and reception of some other information using the same telephone circuit.

If it is possible to transmit and receive some information while speaking on the telephone, the function of the telephone can be expanded. There has been proposed a method in which when a character, figure or the like is written down by a pen on a tablet, the position of the pen at each moment is outputted in the form of analog or digital data of x and y co-ordinates and these two x and y data are received to reconstruct the original character, figure or the like. Since the character, figure or the like is written by hand, the x and y data are relatively low in speed. It would be very convenient if these x and y data could be transmitted and received via a telephone circuit while speaking on the telephone.

As systems for transmitting and receiving some information while speaking on the telephone, there have been proposed a system that transmits a voice and other information using different circuits and a system that frequency-divides or time-divides the same telephone circuit for transmitting a voice and information individually. Of these conventional systems, the system employing a plurality of independent circuits for transmission requires circuits of the same number as the information to be transmitted and received and hence is not preferred from the viewpoint of efficient utilization of circuit.

The frequency division system is a system that divides a transmission frequency band and transmits a voice signal and an information signal in the divided, different bands. Accordingly, the voice frequency band for voice transmission is narrower than an ordinary voice transmission frequency band and a portion of the voice frequency component is removed, resulting in deteriorated voice quality such as lowered loudness and intelligibility. For enhancement of the voice quality, there has been proposed a method that applies the transmitted voice to a non-linear circuit by which the voice component in the removed band is synthesized approximately. But it is doubtful to what extent the voice information once lost can be recovered by such processing. Also there has been proposed a method of compressing the information of a voice by the band compression techniques, but this method is still in the stage of study since various band compression techniques are confronted with a problem in the voice quality.

The time division system is a system that transmits a voice and other information while changing them over at short-time intervals and interpolates the voice after reception. In this case, the voice quality is deteriorated by cutting-off of the voice waveform and its discontinuous connection. Another method that has been proposed is to compress the voice waveform in terms of time, but this is still in the stage of study. Further, there has been proposed a method of inserting the information signal in a pause/silence period, but this method is not capable of completely simultaneous transmission and further presents a problem in that a voice switch is needed.

A system that superimposes the voice and the information on each other is proposed in I.B.M. Technical Disclosure Bulletin 1964, 4, "Voice-Data System". According to this system, a data signal is phase modulated and the modulated output is transmitted after being superimposed on the high-frequency portion of the voice. Since the high-frequency portion of the voice is usually smaller in energy than the low-frequency portion, the high-frequency portion of the voice is regarded as a noise with respect to the modulated data signal, and the data is received and demodulated and the data signal in the voice is removed therefrom utilizing the demodulated output. In practice, however, the high-frequency portion of the voice may sometimes have a relatively large amount of energy, and consequently the data signal cannot correctly be demodulated in some cases.

An object of the present invention is to provide a voice band multiplex transmission system which permits simultaneous transmission of a voice and some other information via the same voice circuit without partial removal of a voice component, and consequently with good volume and intelligibility and with substantially no deterioration of the voice quality.

Another object of the present invention is to provide a voice band multiplex transmission system which performs voice transmission of good quality without losing a portion of the voice signal, and permits correct demodulation of information transmitted simultaneously with a voice being signal and superimposed thereon.

SUMMARY OF THE INVENTION

The frequency spectrum of a voiced sound is observed as a line spectral series composed of the fundamental frequency or a so-called pitch frequency of the voice and frequencies of its higher harmonics. In the present invention, utilizing the harmonics structure of the voice, an information signal desired to be transmitted together with a voice signal is represented by a signal having a spectrum separable from the voice spectrum and this signal is superimposed on the voice signal for transmission. That is, first and second sine-wave signals of first and second frequencies are frequency modulated by the same information signal so that frequency variations of the sine-wave signals may correspond to variations of the information signal, and the modulated outputs are superimposed on the voice signal. In this case, the first and second sine-wave signals are disposed in different first and second predetermined frequency bands which do not overlap each other, and the frequency ratio k between the first and second sine-wave signals is set to a value, for example, 1.918, 2.119 or so, which cannot be represented by a simple integral ratio so that it does not coincide with the harmonic relation of the voice spectrum in the voice circuit band. As a consequence, at least one of the first and second sine-wave signals does not overlap the voice spectrum. It is desirable that the amount of variation of the information signal for frequency modulating the sine-wave signals is such that the modulated first and second sine-wave signals can be regarded as a single line spectrum in a short time. But it is sufficient that even if the spectra of the first and second sine-wave signals spread, their peaks could be detected. In view of this, it is general that the frequency variations of the sine-wave signals are less than 1 KHz in a second.

On the receiving side, the pitch of the voice is first extracted from the transmitted superimposed signal. This pitch extraction may be performed by known pitch extraction methods, for example, by a method of detecting a maximum peak of the short time autocorrelation function of a signal. Based on the pitch information thus detected, the pitch frequency and its harmonic components are removed from the received superimposed signal. This operation is performed by using, for example, a variable frequency comb filter and controlling its rejection frequency with the extracted pitch frequency. In this way, the voice component is removed from the received superimposed signal. The signal having the voice component removed therefrom is split into the aforementioned first and second frequency bands, and in each band, one frequency having a level larger than a predetermined threshold is detected. Since at least one of the first and second sine-wave signals is disposed so that it may not overlap the voice spectrum, at least one of the first and second sine-wave signals can surely be detected from the output of the comb filter that is used to remove the voice component. The detected sine-wave signal which has been detected in either one of the high-frequency band and low-frequency band is converted by multiplying its frequency value by 1/k or k into the frequency value of the other sine-wave signal in the other frequency band. The original information is demodulated from one or both of the converted signal and the detected signal which is not converted. As for the voice signal, the superimposed signal may be outputted as it is. From the viewpoint of enhancement of the voice quality, the frequency components of the first and second sine-wave signals are removed from the superimposed signal, based on the detected frequency value, and then the superimposed signal is outputted, or the voice component is taken out from the superimposed signal, using a variable comb filter which permits the passage therethrough of the pitch frequency and its harmonic frequencies. The voice component that is lost by applying the superimposed signal to the filter for removing the first and second sine-wave components from the superimposed signal is very small, and accordingly the resulting quality deterioration is very slight.

Since no distinct harmonics structure is observed in the spectrum of an unvoiced sound, the principles described above do not apply in this case. But since the power of the unvoiced sound is usually small, the information signal can be detected even in the unvoiced sound period by increasing the power of the first and second sine-wave signals and setting thresholds for detection to be large.

BRIEF DESCRIPTION OF THE DRAWINGS

FIG. 2 is a block diagram showing an example of a variable digital sine-wave generator;

FIGS. 3A to 3E, inclusive, are graphs showing examples of frequency spectra occurring at respective parts in the embodiment of FIG. 1;

DESCRIPTION OF THE PREFERRED EMBODIMENTS

Figure 1:
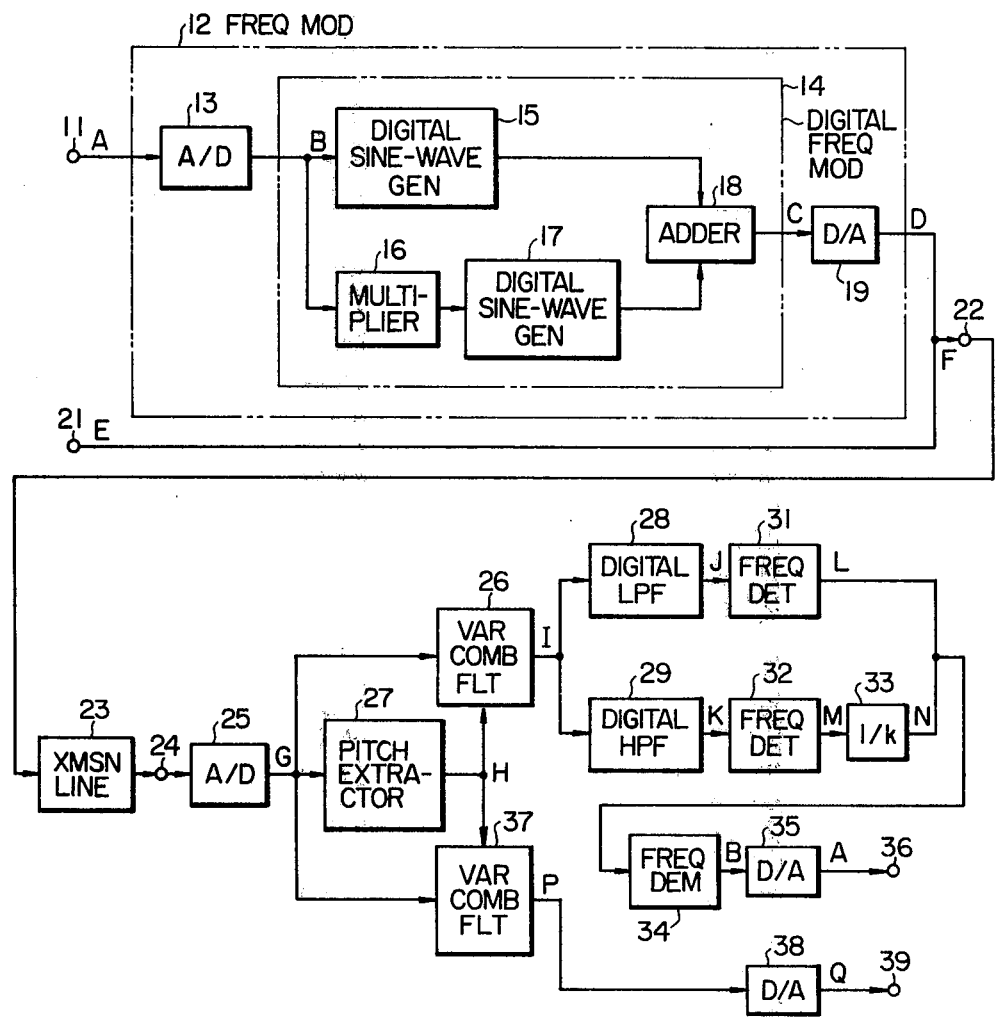
FIG. 1 is a block diagram illustrating an embodiment of a voice band multiplex transmission system of the present invention.

In FIG. 1 there is illustrated an embodiment of the voice band multiplex transmission system of the present invention. Input information A to be transmitted together with a voice is applied via a terminal 11 to a frequency modulator 12, wherein first and second sine-wave signals are frequency modulated by the input information A; namely, variations in the input information are detected as frequency changes in the sine-wave signals. In this embodiment, the frequency modulation is performed by digital processing, and in the case of the input information A being an analog signal, it is applied to an analog-to-digital converter (hereinafter referred to as the A-D converter) 13 for conversion into a digital signal B. The digital signal B is provided to a digital frequency modulator 14 to derive therefrom, as modulated outputs, frequency-modulated sine-wave signals C of two frequencies. In the frequency modulator 14, for example, a digital sine-wave generator 15 is provided, which is supplied with the output digital signal B from the A-D converter 13, as a coefficient for determining the frequency of the sine-wave generator 15, to yield a sine-wave signal of a frequency corresponding to the output digital signal B. The digital signal B is multiplied by a constant k in a multiplier 16 to provide a multiplied output, by which the output frequency of a digital sine-wave generator 17 is controlled. The output sine-wave signals from the sine-wave generators 15 and 17 are added together in an adder 18. The added output is applied to a digital-to-analog converter (hereinafter referred to as the D-A converter) 19 for conversion into an analog signal D.

As the digital sine-wave generator 15, use can be made of a generator disclosed, for instance, in Bernard Gold et al, "Digital Processing of Signals", pp. 146-147, McGraw-Hill, 1969. As shown in FIG. 2, and in the same manner as in this literature, page 146, FIG. 5.13, a signal available at an output terminal 42 of the digital sine-wave generator is applied to multipliers 44a and 44c via a delay unit 43 which has a delay equal to one sampling period, i.e. one arithmetic operation period $\tau$, and the output from the multiplier 44c is added with the output from a multiplier 44d in an adder 45, whose output is provided to a delay unit 46 having a delay $\tau$. The output from the delay unit 46 is applied to multipliers 44b and 44d, and the output from the multiplier 44b is added with the output from the multiplier 44a in an adder 47, whose added output is provided to the output terminal 42. In the multipliers 44a, 44b, 44c and 44d, the input signals thereto are respectively multiplied by constants A, B, C and D. When $A=D=\cos bT$ and $B=-C=\sin bT$, $\sin nbT$ is obtained at the output terminal 42. The constant $A=D$ is produced by a calculator 48 in connection with the output from the A-D converter 13 and the constant $B = -C$ is produced by a calculator 49. These constants $A = D$ and $B = -C$ are respectively supplied to the multiplier 44a and the multipliers 44b, 44c and 44d to yield at the output terminal 42 a digital sine-wave signal of the frequency corresponding to the digital value of the input information. The sine-wave generator 17 can also be formed similarly.

The sine-wave signals of two frequencies derived from the frequency modulator 12 have a frequency ratio k of, for example, 1.918, 2.119 or so, which is so determined as not to coincide with the harmonics relationship of voice frequency spectra in a voice band, and are separately disposed in two predetermined frequency bands which do not overlap each other. The sine-wave signals vary their frequencies in response to the input information A while maintaining the abovesaid frequency ratio k therebetween. As shown in FIG. 3A, when the frequency $f_1$ of the first sine-wave signal is disposed in a frequency band $F_1$, the frequency $f_2$ of the second sine-wave signal is $kf_1$, which is disposed in a frequency band $F_2$ higher than the frequency band $F_1$. The frequencies $f_1$ and $f_2$ vary in response to variations in the input information A, and since the speed of variation of the input information A is low, the speed of the frequency variations is limited so that each of the two signals can be regarded as substantially one sine-wave signal or even if their frequencies spread due to sideband waves, the peak values of the spreading frequencies can be detected on the receiving side.

The frequency modulated output D derived from the frequency modulator 12 is superimposed on an analog voice signal E which is applied from a terminal 21 and has a frequency spectrum such, for example, as shown in FIG. 3B, providing an analog superimposed signal F having a spectrum depicted in FIG. 3C, which is sent out onto a transmission line 23 from a transmission output terminal 22. The analog superimposed signal F transmitted over the transmission line 23 and received at a reception input terminal 24 is separated into the input information A and the analog voice signal E. This separation is carried out by digital processing in the present embodiment. The analog superimposed signal F at the terminal 24 is converted by an A-D converter 25 to a digital superimposed signal G. The digital superimposed signal G is applied to a variable comb filter 26 which is equipped with a characteristic for suppressing a predetermined frequency and its harmonic components and a pitch extractor 27 which extracts a voice fundamental frequency, that is, what is called the pitch frequency. The pitch extractor 27 may be a known one, which extracts the pitch frequency H in the digital superimposed signal G by detecting a maximum peak of the short time autocorrelation function of the digital superimposed signal G, as set forth, for example, in L. R. Rabiner et al, "Digital Processing of Speech Signals", Prentice-Hall, 1978, pp. 150–158, "4.8 Pitch Period Estimation Using the Autocorrelation Function". This voice fundamental frequency H controls the characteristic of the comb filter 26. The comb filter 26 is designed to reject all integral multiples of the pitch frequency in the band of the received signal F.

Figure 4:
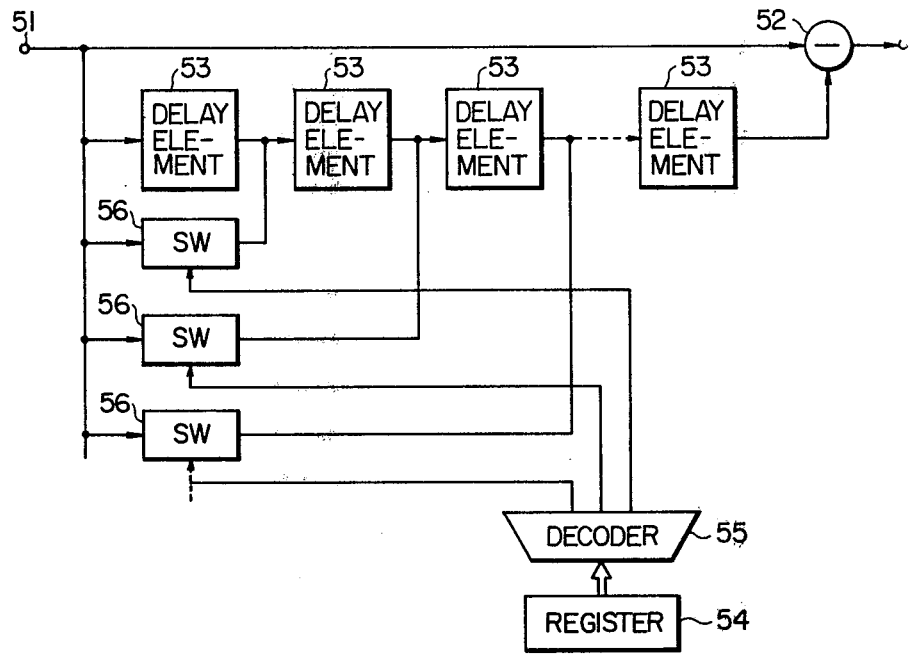
FIG. 4 is a block diagram illustrating an example of a variable comb filter used in the embodiment of FIG. 1.

As such a comb filter 26, a variable-frequency, digital comb filter can be employed. For instance, as shown in FIG. 4, the digital superimposed signal G is supplied from a terminal 51 to a subtractor 52 and, at the same time, applied thereto via a cascade connection of unit delay elements 53, each having a delay equal to one computation period, that is, one sampling period $\tau$. On the other hand, the extracted pitch frequency is set in a register 54 and then decoded by a decoder 55, by the output of which any one of a plurality of switches 56 is turned ON. By control of the switches 56, the number m of unit delay elements 53 to be inserted between the terminal 51 and the subtractor 52 is varied so that the total amount of delays, $m\tau$, of the inserted unit delay elements may be equal to the extracted pitch period. As for the fixed frequency characteristic, this kind of digital comb filter is shown, for example, in Bernard Gold et al, "Digital Processing of Signals", pp. 85, FIG. 3.23(a), McGraw-Hill, 1969.

In FIG. 1, there is obtained a signal I wherein the voice fundamental frequency H and its harmonic components in the digital superimposed signal G have been removed therefrom by the comb filter 26. The signal I is applied to a digital low-pass filter or digital low band-pass filter 28 whose pass band is the frequency band $F_1$, and is also applied to a digital high-pass filter or digital high band-pass filter 29 whose pass band is the frequency band $F_2$, producing output signals J and K, respectively. The filter output signals J and K are respectively supplied to frequency detectors 31 and 32. The frequency detectors 31 and 32 each have a function that detects one frequency component larger than a predetermined threshold and determines its frequency. Such a frequency detector can be so arranged, for example, as to obtain the frequency spectrum of the input signal thereto by a discrete Fourier transform operation and to detect, by processing, the frequency of that frequency component in the calculated frequency spectrum which is larger than the predetermined threshold. In this case, since the signals I applied to the filters 28 and 29 have removed therefrom the frequency spectrum component of a voice, they correspond to the frequencies $f_1$ and $f_2 = kf_1$ of the two sine-wave signals derived from the frequency modulator 12. In each of the frequency detectors 31 and 32, only one frequency spectrum can exceed the threshold. The frequency (identified as a signal M) detected by the frequency detector 32 is converted by a frequency converter 33 to $1/k$ of the frequency in accordance with the value of the ratio k determined by the frequency modulator 12. Accordingly, the frequency represented by an output signal N from the frequency converter 33 coincides with the frequency $f_1$ (identified as a signal L) detected by the frequency detector 31.

The signals L and N are supplied to a frequency demodulator 34 for conversion into a voltage corresponding to the frequency. This conversion can be performed, for example, by preparing a table for the conversion of the input frequency to the corresponding output voltage and looking up in the conversion table the frequency $f_1$ represented by the signals L and N to output the corresponding voltage. The demodulated output signal from the frequency demodulator 34 coincides with the digital signal B of the input information on the transmitting side and is converted by a D-A converter 35 to the original analog signal A, which is derived at an output terminal 36.

As described above, since the two frequency signals of the frequencies $f_1$ and $f_2$ in the two frequency bands $F_1$ and $F_2$ are employed for the transmission of the input information A and since their frequency ratio k is selected not to bear a harmonic relation to the frequency spectrum of a voice signal, even if the signal of one of the frequencies is rejected by the comb filter 26, that is, even if the signal of the frequency, for example, $f_1$ coincides with the voice spectrum, the signal of the other frequency $kf_1$ is detected at the output of the comb filter 26, as shown in FIG. 3D. Accordingly, the information signal A can be detected accurately and stably without any interference by the voice signal E.

The digital output signal G converted from the received signal is applied to a variable comb filter 37 which has a characteristic that permits the passage therethrough of the pitch frequency and its harmonic components. The characteristic of the variable comb filter 37 is controlled by the pitch frequency H extracted by the pitch extractor 27. The variable comb filter 37 may comprise an arrangement that, for example, employs an adder in place of the subtractor 52 in FIG. 4. In the manner described above, the voice spectrum is derived from the variable comb filter 37. The output signal P from the variable comb filter 37 is converted by a D-A converter 38 to an analog signal Q to provide the original analog voice signal E at an output terminal 39.

Figure 5:
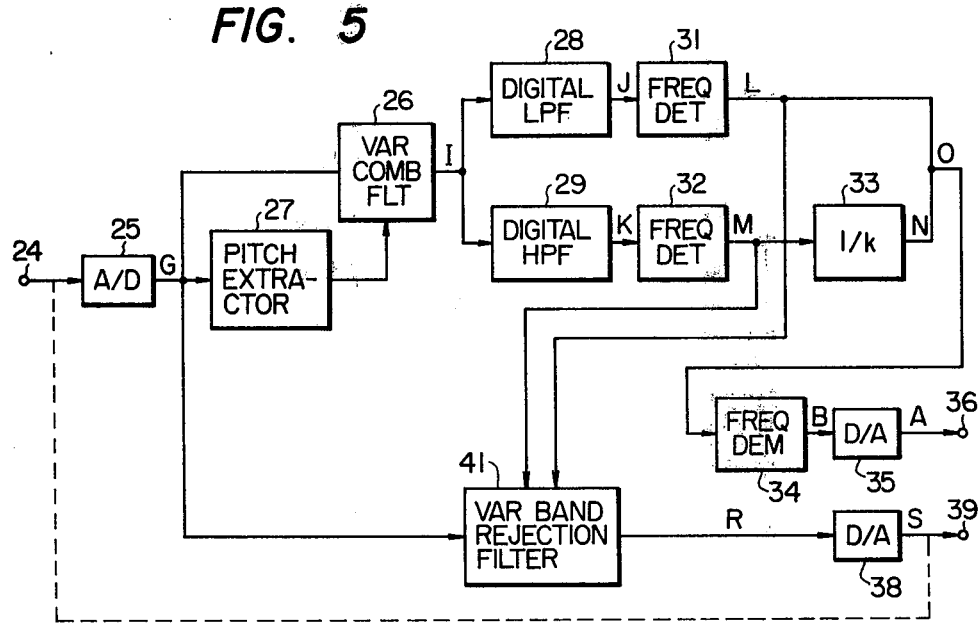
FIG. 5 is a block diagram showing the receiving side in another embodiment of the voice band multiplex transmission system of the present invention.

The voice signal may also be extracted using a circuit arrangement of the type shown in FIG. 5 in which parts corresponding to those in FIG. 1 are identified by the same reference numerals. The received digital superimposed signal G is applied directly to a variable band rejection filter 41 without being passed through the variable comb filter. The signals L and M representing the frequencies $f_1$ and $f_2$ detected by the frequency detectors 31 and 32 are provided to the variable band rejection filter 41 to set the frequencies $f_1$ and $f_2$ as those to be rejected. Consequently, the frequency components $f_1$ and $f_2$ of the digital superimposed signal G are removed and the filtered output signal R is applied to the D-A converter 38. As the variable band rejection filter 41, use can be made of a filter, for example, of the type performing such processing that obtains the frequency spectrum of the superimposed signal G by the discrete Fourier transform calculation, reduces to zero the components of those frequencies $f_1$ and $f_2$ in the spectrum represented by the signals L and M and subjects the remaining spectrum to an inverse discrete Fourier transform operation. In the case where the first and second sine-wave signals superimposed on each other are not so jarring with respect to the voice, the received signal F may also be provided directly as a voice output at the output terminal 39, as indicated by the broken line in FIG. 5.

Figure 6:
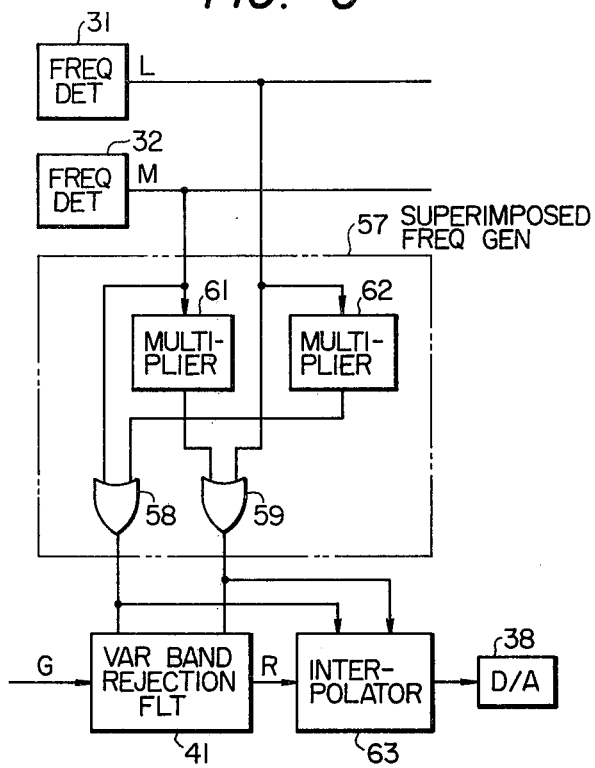
FIG. 6 is a block diagram illustrating a part of another example of the receiving side of the voice band multiplex transmission system of the present invention.

One of the frequencies $f_1$ and $f_2$ of the first and second sine-wave signals may coincide with the voice spectrum, and in such a case, only one of the frequency detectors 31 and 32 detects the frequency. In this case, the other frequency is produced from the detected one and these frequency components are removed by the band rejection filter 41 in FIG. 5. To this end, for example, as depicted in FIG. 6, the signals L and M respectively representing the frequencies $f_1$ and $f_2$ detected by the frequency detectors 31 and 32 are supplied to a superimposed frequency generator 57. In the superimposed frequency generator 57, the signals L and M are respectively applied to OR gates 58 and 59 and multipliers 61 and 62. In the multiplier 61, the frequency $f_1$ represented by the signal L is multiplied by k to $kf_1 = f_2$, whereas in the multiplier 62, the frequency $f_2$ represented by the signal M is multiplied by $1/k$ to $f_2/k = f_1$. The multiplied outputs from the multipliers 61 and 62 are respectively provided to the OR gates 58 and 59, the outputs from which are both fed to the variable band rejection filter 41. In this way, even in the case where only one of the frequencies $f_1$ and $f_2$ is detected by one of the frequency detectors 31 and 32, the other frequency is produced and components of the both frequencies $f_1$ and $f_2$ in the voice are removed by the band rejection filter 41. For example, in the example shown in FIG. 3, the frequency $f_1$ is produced from the detected frequency $f_2$ and the output from the band rejection filter 41 takes the form depicted in FIG. 3E in which the frequency $f_1$ in the voice spectrum has been removed therefrom. The superimposed frequency generator 57 may be formed not only as a digital circuit but also as an arrangement that obtains the same function as the digital circuit by processing.

In the case where the frequency is detected by only one of the frequency detectors 31 and 32, the other frequency coincides with the voice spectrum; accordingly, in FIG. 6, the frequency component in the voice spectrum coincident with the frequency is also removed by the variable band rejection filter 41, resulting in the quality of the voice being degraded a little. To avoid this, as occasion demands, the output from the filter 41 is applied to an interpolator 63, wherein the frequency component removed from the voice spectrum is interpolated in the filter output. This interpolation is carried out in the following manner: For example, the spectrum envelope of the voice spectrum frequency characteristic is obtained and that one of the frequencies $f_1$ and $f_2$ which coincides with the voice spectrum is inserted, as a level crossing the spectrum envelope at the frequency, into the output R from the filter 41. The signal thus interpolated is applied to the D-A converter 38.

Figure 7:
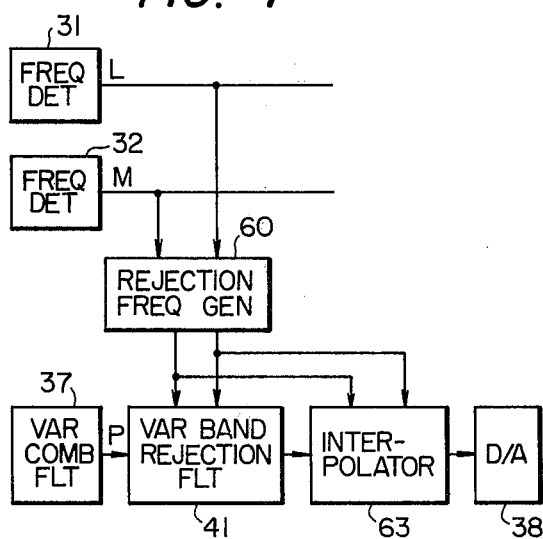
FIG. 7 is a block diagram showing a part of a modified form of the embodiment of FIG. 1 which employs the receiving side shown in FIG. 6.

Also in the embodiment illustrated in FIG. 1, when one of the frequencies $f_1$ and $f_2$ of the first and second sine-wave signals coincides with the voice spectrum, this sine-wave signal is not removed by the variable comb filter 37. Accordingly, in the case where there is a fear that the sine-wave signal coincident with the voice spectrum will be offensive to the ear, the sine-wave signal component can be eliminated in the same manner as described previously in connection with FIG. 6. For example, as shown in FIG. 7 in which parts corresponding to those in FIGS. 1 and 6 are identified by the same reference numerals, a voice spectrum signal P taken out by the variable comb filter 37 is supplied to the variable band rejection filter 41. The frequencies detected by the frequency detectors 31 and 32 are applied to a rejection frequency generator 60 to produce a frequency coincident with the voice spectrum. The rejection frequency generator is similar to the superimposed frequency generator 57 shown in FIG. 6, but instead of taking OR by OR gates 58, 59, the detected outputs from the frequency detectors 31, 32 are simply multiplied at the multipliers 61, 62 and supplied to the band rejection filter 41. In this case, as well as the case of FIG. 6, the multiplier 61 can be used in common with the frequency converter 33. This frequency component in the voice spectrum is removed by the band rejection filter 41. The output R from the filter 41 may be supplied to the D-A converter 38 directly or after being subjected to interpolation by the interpolator 63 for the same reason as referred to previously with regard to FIG. 6.

Figure 8:
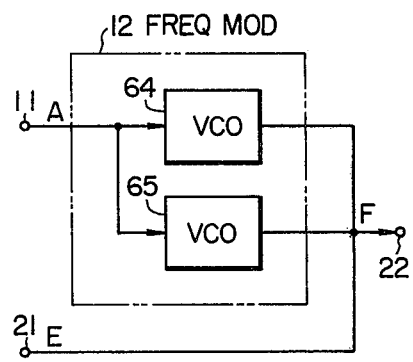
FIG. 8 is a block diagram illustrating an example of an analog frequency modulator.

In FIG. 1, the frequency modulator 12 may also be an analog modulator. For instance, as shown in FIG. 8, analog input information A is applied from the terminal 11 to voltage-controlled oscillators 64 and 65. As the voltage-controlled oscillators 64 and 65, use is made of such oscillators which have therebetween an oscillation frequency ratio k when the voltage at the terminal 11 is zero and which have linear frequency-control voltage characteristics that intersect the voltage axis at the same point. In the case where the input information is a digital signal, it is converted to an analog signal for input to the voltage-controlled oscillators 64 and 65.

In the case of performing digital processing by the frequency modulator 12, the digital processing can also be carried out by an electronic computer. In such a case, the output from the A-D converter 13 in FIG. 1 is applied to the electronic computer which has prestored a table of the level and the frequency of the input information A and in which the table is read out by the input digital information to output by calculation, as digital values, a sine-wave signal of the frequency and a sine-wave of a frequency k times the frequency. In this case, the frequency detectors 31 and 32 are adapted so that they check, for each operation period, whether the outputs from the filters 28 and 29 are above or below a threshold, start counting of clock pulses upon detection of the filter outputs exceeding the threshold, and obtain the periods of detected frequencies from the count values at the same time of the inputs exceeding again the threshold after becoming lower than the threshold. The operations can easily be performed by processing with a computer.

Figure 9:
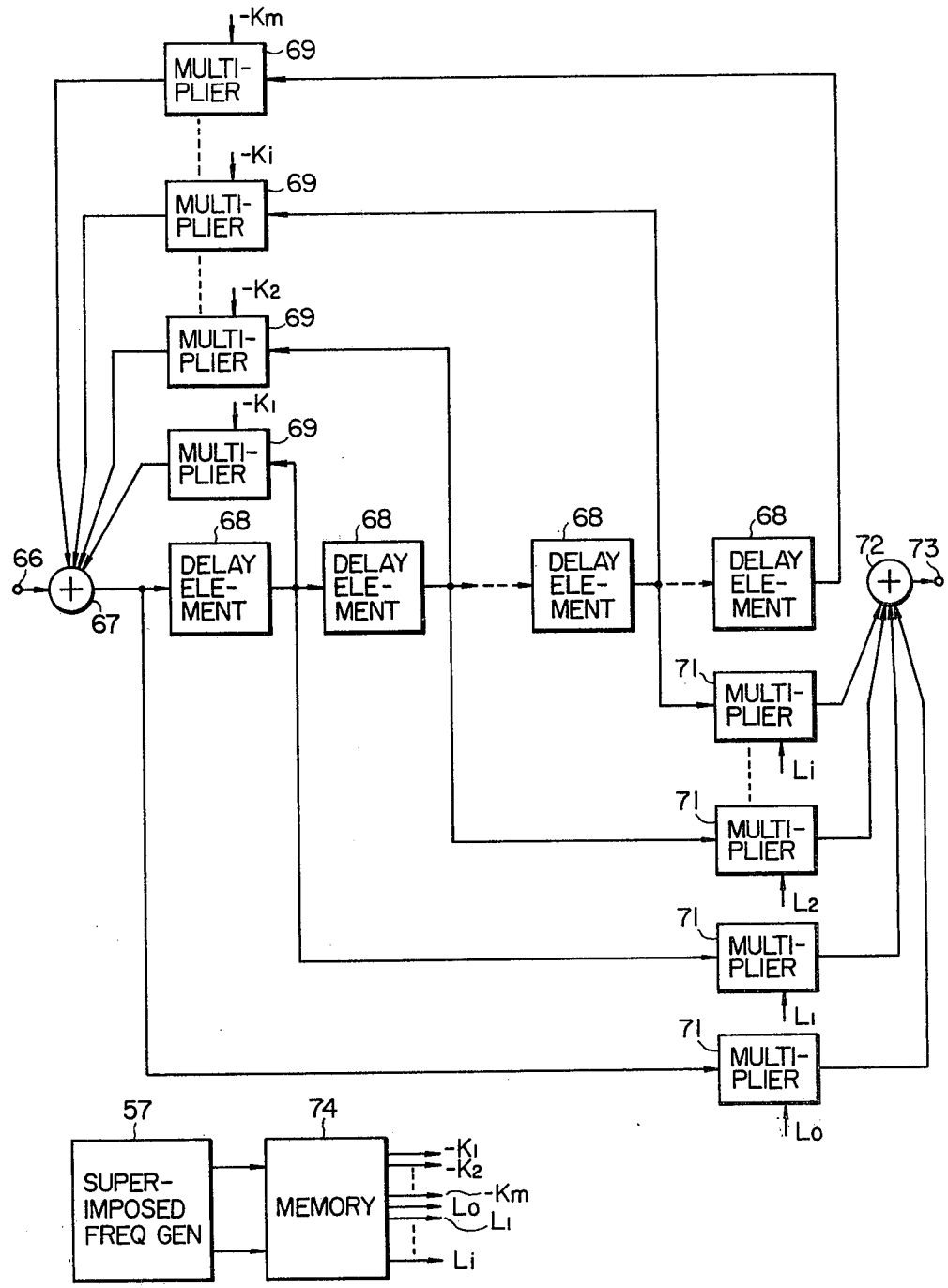
FIG. 9 is a block diagram showing an example of a variable band rejection filter employed in the embodiment of FIG. 5.

The variable band rejection filter 41 used in FIG. 5 is not always limited specifically to the arrangement for the processing utilizing the Fourier transformation but may also be formed, for example, by a digital filter. The digital band rejection filter is shown, for instance, in the aforementioned literature "Digital Processing of Signals", p. 42, FIG. 2.20. FIG. 9 illustrates this digital band rejection filter. In FIG. 9, the input at an input terminal 66 is fed to an adder 67, and its output is applied to a cascade connection of delay elements 68, each having a delay equal to the sampling period $\tau$. The outputs from the delay elements 68 are respectively supplied to multipliers 69, wherein they are multiplied by constants $-k_1, -k_2, \ldots$ and $-k_m$, respectively. The multiplied outputs are provided to the adder 67. The output from the adder 67 and the outputs from first r stages of the delay elements 68 are respectively multiplied by constants $L_0, L_1, L_2, \ldots$ and $L_i$ in multipliers 71 and their multiplied outputs are added together by an adder 72, whose added output is provided as a filtered output at an output terminal 73. The constants $-k_1$ to $-k_m$ and $L_0$ to $L_i$ are modified by the frequencies $f_1$ and $f_2$ to be eliminated. The relationships between the frequencies and the constants are prestored in a memory 74; the memory 74 is read out by the output frequencies of the frequency detectors 31 and 32 or the output frequency of the superimposed frequency generator 57; and the constants thus read out from the memory 74 are imparted to the corresponding ones of the pluralities of multipliers 69 and 71.

In the case where the detected frequency of the frequency detector 31 and the output frequency of the frequency converter 33 do not coincide with each other due to noise or by some other cause, the output frequency of the frequency converter 33 can preferentially be supplied to the demodulator 34. The reason is that since a voice is usually low in level on the high-frequency side, the signal of the frequency $f_2$ is less likely to be erroneous than the signal of the frequency $f_1$. In the case of non-coincidence, it is also possible to retain the values in the immediately preceding period. Furthermore, instead of multiplying the output frequency of the frequency detector 32 by 1/k by the frequency converter 33 as explained before, the frequency converter 33 may be provided after the frequency detector 31 so as to multiply the output frequency therefrom by k.

Figure 10:
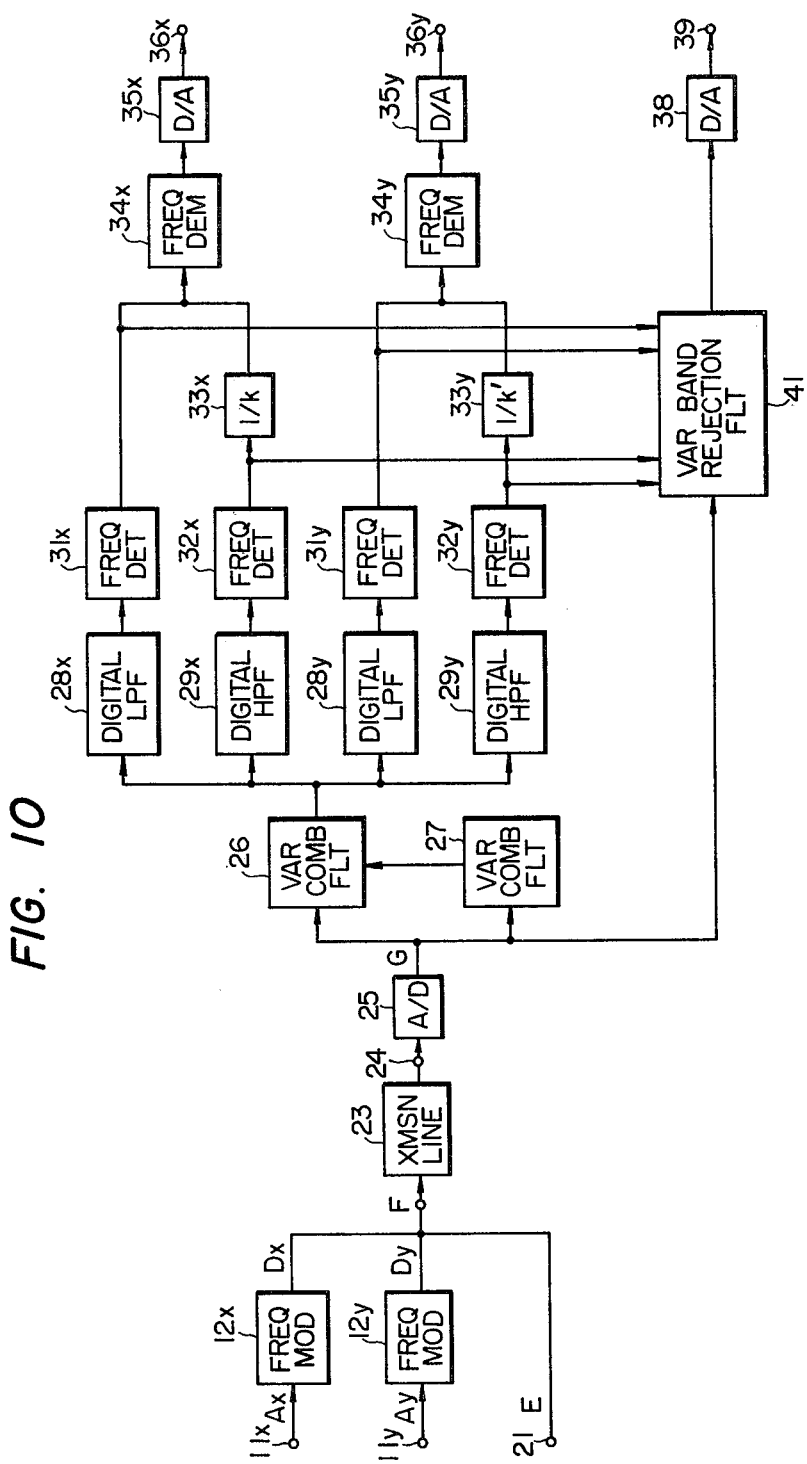
FIG. 10 is a block diagram illustrating another embodiment of the present invention as being applied to the case where a plurality of input informations are superimposed on a voice.

The present invention is applicable not only to transmitting a piece of input information, as information other than a voice, together with a voice signal but also to simultaneous transmission of pieces of input information and a voice signal. FIG. 10 shows the case of transmitting two pieces of input information simultaneously with a voice signal. In FIG. 10, parts corresponding to those in FIGS. 1 and 5 are identified by the same reference numerals with suffixes "x" and "y" respectively corresponding to input information Ax at an input terminal 11x and input information Ay at an input terminal 11y. In a frequency modulator 12x, sine-wave signals of frequencies $f_{1x}$ and $f_{2x}=kf_{1x}$ are frequency modulated by the input information Ax, with the frequency ratio k maintained. In a frequency modulator 12y, sine-wave signals of frequencies $f_{1y}$ and $f_{2y}=k'f_{1y}$ are frequency modulated by the input information Ay, with the frequency ratio k' retained. The respective frequencies are selected to bear such a relationship that $f_{1x}<f_{1y}<kf_{1x}<k'f_{1y}$, and k may be equal to k'. The modulated outputs Dx and Dy are superimposed on the voice signal E for transmission. On the receiving side, the pitch is extracted by the pitch extractor 27, and the pitch frequency and its higher harmonics are removed by the variable comb filter 26 from the received superimposed signal G; namely, the voice components are eliminated. The output from the variable comb filter 26 is applied to filters 28x, 28y, 29x and 29y whose pass bands are the frequency bands to which the frequencies $f_{1x}, f_{1y}, f_{2x}$ and $f_{2y}$ respectively belong. The outputs from the filters 28x, 28y, 29x and 29y are respectively supplied to frequency detectors 31x, 31y, 32x and 32y, wherein the frequencies $f_{1x}, f_{1y}, f_{2x}$ and $f_{2y}$ are detected. The detected frequencies of the frequency detectors 32x and 32y are respectively multiplied by 1/k and 1/k' in frequency converters 33x and 33y. The converted output frequencies and the output frequencies of the frequency detectors 31x and 31y are respectively converted by demodulators 34x and 34y to voltages, which are, in turn, converted by D-A converters 35x and 35y to analog signals, thus obtaining the original input information Ax and Ay.

With such a system as described above in which two pieces of information are superimposed on a voice for transmission, it is possible to input a handwritten figure or character entered from a tablet, output it as analog information x and y, transmit them after superimposing them on a voice and reproduce the figure or character by an X-Y recorder system on the receiving side. The input information is not limited specifically to such handwritten but may also be information such, for example, as indicating the originating terminal of a busy call reception; therefore, the system of the present invention is fit for various uses. The permissible highest frequency of input information depends on the performance of the frequency detectors 31 and 32 used on the receiving side; according to our experiments, in the case of detection by the discrete Fourier transform in an observation time of 30 ms, a frequency change of the sine-wave signal in the observation time which was as small as about 20 Hz could be detected. Accordingly, the frequency change of the sine-wave signal representing a change in the input information is allowed to 600 Hz in a second but preferably below 300 Hz.

As will be appreciated from the foregoing, in the voice multiplex transmission system of the present invention, processing by an electronic computer can be employed at respective parts and the methods of so-called fast Fourier transformation and inverse fast Fourier transformation can be used for efficiently achieving the discrete Fourier transformation and the inverse discrete Fourier transformation. Each of the comb filters 26 and 37 need not always be a digital filter, as shown in FIG. 4, but may also comprise an arrangement that subjects the input to discrete Fourier transformation, removes the extracted pitch frequency and frequencies of its integral multiples or the other frequencies from the spectrum obtained by the transformation and subjects the remaining spectrum to inverse discrete Fourier transformation.

As has been described in the foregoing, according to the present invention, in the case of simultaneous transmission of a voice signal and other information, the frequency band for the transmission of the voice signal is not reduced; since input information other than the voice is superimposed as signals of two frequencies of a frequency ratio bearing no harmonic relation to the voice spectrum, the voice spectrum can entirely be taken out and there does not incur quality deterioration which would otherwise result from cutting-off of a band, and consequently the voice is obtained continuously and there is no quality degradation which would otherwise accompany a discontinuous connection of a waveform. As regards the transmisson of the information other than the voice, since two frequencies of the signals which are selected not to bear the same relation as the harmonic relationship of the voice spectrum are modulated, even if the voice signal is superimposed on the two modulated signals, the input information can stably be detected. Thus, the present invention is greatly advantageous in that it satisfies the demands for high voice quality and efficient utilization of a telephone circuit.

It will be apparent that many modifications and variations may be effected without departing from the scope of the novel concepts of this invention.

What is claimed is:

1. A voice band multiplex transmission system comprising:
    frequency generating means for generating first and second signals having first and second frequencies respectively;
    modulating means connected to said frequency generating means for frequency modulating said first and second signals by the same input information while maintaining the frequency ratio between the said first and second frequencies, the first and second frequencies respectively belonging to predetermined first and second frequency bands and bearing no harmonic relation to each other in the band of a voice circuit;
    means for superimposing the modulated first and second signals and an input voice signal on one another and sending them out on a transmission line;
    receiver means coupled to said transmission line and comprising pitch extracting means for extracting a pitch frequency of said input voice signal from the signal received from the transmission line;
    first comb-characteristic filter means supplied with said received signal to reject the extracted pitch frequency and frequencies of its integral multiples;
    first and second filter means respectively supplied with the output from the first comb-characteristic filter means and having the first and second frequency bands as their pass bands;
    first and second frequency detecting means, each supplied with the output from one of the first and second filter means to detect one frequency larger than a predetermined threshold;
    multiplying means for multiplying one of the detected frequencies of the first and second frequency detecting means by said frequency ratio or a reciprocal of the frequency ratio to coincide with the other detected frequency;
    demodulating means for producing a signal of a level corresponding to said other detected frequency and the output frequency of the multiplying means; and
    voice output means for obtaining the voice signal from said received signal.

2. A voice band multiplex transmission system according to claim 1, wherein the voice output means comprises second comb-characteristic filter means which is supplied with the received signal and permits the passage therethrough of the extracted pitch frequency and frequencies of its integral multiples.

3. A voice band multiplex transmission system according to claim 2, further comprising rejection frequency generating means for producing, from the detected frequency from one of the first and second frequency detecting means, a frequency to be detected by the other frequency detecting means, and variable band rejection filter means for removing from the output of the second comb-characteristic filter means the frequency component produced by the rejection frequency generating means.

4. A voice band multiplex transmission system according to claim 3, further comprising interpolating means for interrrpolating into the output of said variable band rejection filter means a voice component of the frequency produced by the rejection frequency generating means.

5. A voice band multiplex transmission system according to claim 1, wherein the voice output means comprises variable band rejection filter means which is supplied with the received signal and rejects the detected frequencies of the first and second frequency detecting means.

6. A voice band multiplex transmission system according to claim 5, further comprising rejection frequency generating means for producing, from the detected frequency from one of the first and second frequency detecting means, a frequency to be detected by the other frequency detecting means, and applying the produced frequency as a rejection frequency to the variable band rejection filter means.

7. A voice band multiplex transmission system according to claim 6, further comprising interpolating means for interpolating into the output from the variable band rejection filter means a voice component of the frequency produced by the rejection frequency generating means.

8. A voice band multiplex transmission system according to claim 1, wherein the voice output means comprises means for outputting the received signal as it is.

9. A voice band multiplex transmission system according to any one of claims 1 or 8, wherein the modulating means comprises a memory storing the corresponding relationships between levels and frequencies and supplied with the input information to output a frequency corresponding to the level of the input information, means for digitally calculating a first signal of the frequency outputted from the memory and a second signal of a frequency having said frequency ratio to the outputted frequency, and means for outputting the first and second digital signals after converting them to first and second analog signals.

10. A voice band multiplex transmission system according to any one of claims 1 to 8, wherein the modulating means comprises a first digital oscillator supplied with the input information as a digital value representing its level to oscillate at a frequency corresponding to the digital value, a multiplier for multiplying the input digital value by the frequency ratio, a second digital oscillator oscillating at a frequency corresponding to the multiplied output value, an adder for adding together the outputs from the first and second digital oscillators, and D-A converter for converting the added value to an analog signal.

11. A voice band multiplex transmission system according to any one of claims 1 to 8, wherein the modulating means comprises a first variable frequency oscillator supplied with analog input information to oscillate at a frequency corresponding to the level thereof, and a second variable frequency oscillator supplied with the input information to oscillate at a frequency of a multiple of said frequency ratio with respect to the oscillation frequency of the first variable frequency oscillator in accordance with the level of the input information.

12. A voice band multiplex transmission system according to claim 10, wherein the first and second frequency detecting means each comprise means for performing a discrete Fourier transform operation, and means for determining the frequency of a single spectrum in the operation results exceeding a threshold.

13. A voice band multiplex transmission system according to any one of claims 3 to 7, wherein the variable band rejection filter means comprises means for performing a discrete Fourier transformation of the received signal, means for removing those frequencies in the frequency spectra obtained by the transformation which are equal to the detected frequencies of the first and second frequency detecting means, and means for performing an inverse discrete Fourier transformation of the frequency spectra left unremoved.

14. A voice band multiplex transmission system according to any one of claims 3 to 7, wherein the second variable band rejection filter means is formed by a digital filter.

15. A voice band multiplex transmission system according to claim 10, wherein the first comb-characteristic filter means comprises means for performing a discrete Fourier transformation of the received signal, and means for removing the pitch frequency and frequencies of its integral multiples in the frequency spectra obtained by the transformation and performing an inverse discrete Fourier transformation of the remaining frequency spectra.

16. A voice band multiplex transmission system according to claim 10, wherein the first comb-characteristic filter means comprises a comb-digital filter for rejecting the fundamental frequency and its higher harmonics, and means for controlling the number of unit delay elements inserted in the digital filter in accordance with the pitch frequency so that their total delay time may be equal to the period of the pitch frequency.

17. A voice band multiplex transmission system according to claim 1, wherein the modulating means are plurally provided, the modulating means being respectively supplied with different input information and the frequencies of the first and second signals of each modulating means being disposed in different frequency bands, wherein the first and second filter means, the first and second frequency detecting means, the multiplier means and the demodulating means are plurally provided respectively corresponding to the plurality of modulating means, and wherein the input information is individually derived from the demodulating means.

18. A voice band multiplex transmission system according to claim 11, wherein the first and second frequency detecting means each comprise means for performing a discrete Fourier transform operation, and means for determining the frequency of a single spectrum in the operation results exceeding a threshold.

19. A voice band multiplex transmission system according to claim 11, wherein the first comb-characteristic filter means comprises means for performing a discrete Fourier transformation of the received signal, and means for removing the pitch frequency and frequencies of its integral multiples in the frequency spectra obtained by the transformation and performing an inverse discrete Fourier transformation of the remaining frequency spectra.

20. A voice band multiplex transmission system according to claim 12, wherein the first comb-characteristic filter means comprises means for performing a discrete Fourier transformation of the received signal, and means for removing the pitch frequency and frequencies of its integral multiples in the frequency spectra obtained by the transformation and performing an inverse discrete Fourier transformation of the remaining frequency spectra.

21. A voice band multiplex transmission system according to claim 13, wherein the first comb-characteristic filter means comprises means for performing a discrete Fourier transformation of the received signal, and means for removing the pitch frequency and frequencies of its integral multiples in the frequency spectra obtained by the transformation and performing an inverse discrete Fourier transformation of the remaining frequency spectra.

22. A voice band multiplex transmission system according to claim 11, wherein the first comb-characteristic filter means comprises a comb-digital filter for rejecting the fundamental frequency and its higher harmonics, and means for controlling the number of unit delay elements inserted in the digital filter in accordance with the pitch frequency so that their total delay time may be equal to the period of the pitch frequency.

23. A voice band multiplex transmission system according to claim 14, wherein the first comb-characteristic filter means comprises a comb-digital filter for rejecting the fundamental frequency and its higher harmonics, and means for controlling the number of unit delay elements inserted in the digital filter in accordance with the pitch frequency so that their total delay time may be equal to the period of the pitch frequency.

* * * * *